(12) United States Patent
Takada (10) Patent No.: US 6,469,409 B1
(45) Date of Patent: Oct. 22, 2002

(54) BRAKE APPARATUS FOR A MOVING APPARATUS DRIVEN BY LINEAR MOTOR

(75) Inventor: Toru Takada, Bisai (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 6 days.

(21) Appl. No.: 09/705,875

(22) Filed: Nov. 6, 2000

(30) Foreign Application Priority Data

Nov. 10, 1999 (JP) .............................. 11-319425

(51) Int. Cl.[7] .............................................. H02K 7/102
(52) U.S. Cl. ........................ 310/77; 310/12; 409/134; 409/193; 409/241
(58) Field of Search ..................... 310/12, 77; 409/134, 409/193, 235, 241

(56) References Cited

U.S. PATENT DOCUMENTS 4,106,291 A * 8/1978 Morgan ..................... 60/369

FOREIGN PATENT DOCUMENTS

JP          10-112971          4/1998

* cited by examiner

*Primary Examiner*—Nestor Ramirez
*Assistant Examiner*—Judson H. Jones
(74) *Attorney, Agent, or Firm*—Oliff & Berridge, PLC (57) ABSTRACT

A brake apparatus for a moving apparatus driven by a linear motor, to support a headstock. The brake apparatus includes an air cylinder disposed parallel with a travelling direction, a compressor to supply fluid under pressure to the air cylinder, a 2-port solenoid valve disposed on a fluid path connecting from the compressor to the air cylinder, and a controlling device that outputs a signal to open the 2-port solenoid valve during normal operation of the linear motor and controls the 2-port solenoid valve to close when the power supply to the linear motor is interrupted or the linear motor is stopped in an emergency.

19 Claims, 4 Drawing Sheets

BRAKE APPARATUS FOR A MOVING APPARATUS DRIVEN BY LINEAR MOTOR

BACKGROUND OF THE INVENTION

1. Field of Invention

The invention relates to a brake apparatus for a moving apparatus driven by a linear motor that is applied to a machine tool or a factory facility.

2. Description of Related Art

A linear motor is applied to an apparatus when a stator mounted to a member on a stationary side, and a movable member mounted to a member on a movable side, are disposed so as to face each other across an air gap. As such, a linear driving force of the linear motor moves in a movable direction when the apparatus is in an energized state. In a conventional moving apparatus driven by the linear motor, a sudden slowdown and a sudden stop can be performed by an electrical control. However, when the power supply to the linear motor is interrupted because of a power failure or a break in a cable, or when the linear motor is stopped in an emergency, electrical control is rendered inoperable. As a result, the member on the movable side (hereinafter referred to as the movable member side) moves into an inert running state. To avoid this problem, a mechanical brake device is provided, with the electrical control device.

One particular mechanical brake device uses a brake that drives at a cylinder, with a member on the movable member side, and a brake pad of the brake pressed against a friction member provided with a member on the stationary side (hereinafter referred to as the stator side), to cause the member on the movable member side to brake. In this case, it is possible to obtain a high brake force at the cylinder, however, the braking response is slow because the time required to move fluid is long compared with the electric signal. Another particular mechanical brake devices uses a magnetic brake, which utilizes an electromagnet and an elastic body such as a spring, with the member on the movable member side. When the power supply to the linear motor is interrupted or the linear motor is stopped in an emergency, a brake pad of the magnetic brake is pressed against a friction member on the stator side through the use of an elasticity of the elastic body, to cause the member on the movable member side to brake. However, during braking, the brake pad of the magnetic brake has to maintain a large surface to receive the pressure therefrom. Accordingly, this increases the size of the moving apparatus.

Japanese Laid-Open Patent Publication No 10-112971 discloses a moving apparatus in which a ferromagnetic plate, having a brake pad, is disposed with a travelling slider, which is a member on the movable member side, via an electromagnet and an elastic body, such as a spring, and a friction member disposed with a member on the stator side. In the moving apparatus, when a power supply to the linear motor is interrupted or the linear motor is stopped in an emergency, the ferromagnetic plate adhered to the electromagnet is separated there from and the brake pad is pressed against the friction member by attraction between the ferromagnetic plate and a fixed magnet as the stator in order to brake the travelling slider. As the attraction works between the ferromagnetic plate and the fixed magnet, an external actuator device, so as to separate the brake pad from the friction member at the start of a normal operation of the linear motor, is also disposed to the travelling slider.

However, since the electromagnet, the elastic body, the brake pad, the ferromagnetic plate, and the external actuator device are disposed to the travelling slider on the movable member side, the number of parts for the mechanical brake device increases. As a result, the cost for the parts also increases. In addition, the increased number of parts brings about an increase in the weight on the travelling slider, a heavier electrical load on the linear motor, and increased costs. Furthermore, the increase in the number of parts increases the size of the travel ling slider, and by extension, the entire moving apparatus.

SUMMARY OF THE INVENTION

The invention provides a brake apparatus having sufficient braking in a simple structure for a moving apparatus driven by a linear motor.

In various exemplary embodiments of a brake apparatus for a moving apparatus driven by a linear motor, the linear motor having a movable member and a stator disposed so as to face each other across an air gap from each other, the moving apparatus having a first member attached to the movable member and a second member attached to the stator, the first member being moved along the stator when the linear motor is energized, the first member being allowed to move downward by gravity along the second member when the linear motor is not energized and the first member is within a moving range thereof, a movement of the first member being controlled electrically in a normal operation of the linear motor, the brake device comprises a cylinder device having a cylindrical member attached to the second member and a piston connected to the first member, the cylindrical member having both end portions including a cylinder end on a side of the first member and another cylinder end on the opposite side of the cylinder end, the cylindrical member defining a first fluid chamber between the piston and the cylinder end; a fluid supply source that supplies fluid under pressure to the first fluid chamber of the cylinder; a first regulating valve disposed on a fluid path between the first fluid chamber of the cylinder and the fluid supply source, the first regulating valve capable of opening and closing, the fluid flowing in the fluid path and the first fluid chamber while the first regulating valve is open and the fluid stemming in the fluid path and the first fluid chamber while the first regulating valve is closed; and a controller that opens the first regulating valve during normal operation of the linear motor and closes the first regulating valve either when power supply to the linear motor is interrupted or an emergency stop is instructed to the linear motor.

During a normal operation of the linear motor, the first regulating valve is opened by the signal from the controller, the fluid pressure is supplied to the cylinder device, and the brake apparatus functions as a counterbalance which can stably operate the first member supported at the piston independently of fluctuations in the load. When the power supply to the linear motor is interrupted or the linear motor is stopped in an emergency, the first regulating valve device is closed when a signal is not received from the controller, the fluid pressure is maintained in the cylinder device as it is just before the power supply is interrupted or the linear motor is stopped in an emergency, and the piston of the cylinder device is brought to a standstill. As a result, the first member, which is supported at the piston, can be completely stopped.

The braking is actuated through the use of a cylinder device that functions as a counterbalance of the moving apparatus during normal operation. Therefore, the invention eliminates the need for various parts for a mechanical brake device. As a result, cost reduction and weight reduction of the member on the movable member side can be achieved. The weight reduction of the member on the first member side lowers the capacity of the linear motor to the moving apparatus, which can contribute to the cost reduction. In addition, the entire moving apparatus can be downsized.

In another exemplary embodiment of a brake apparatus for a moving apparatus driven by a linear motor, the linear motor having a movable member and a stator which are disposed so as to face each other across an lair gap, the moving apparatus having a first member attached to the movable member land a second member attached to the stator, the first member moved along the stator when the linear motor is energized, a movement of the first member being controlled electrically in a normal operation of the linear motor, the brake apparatus comprises a double-acting cylinder device having a cylindrical member attached to the second member and a piston which is connected to the first member, the cylindrical member having both end portions including a cylinder end on a side of the first member and another cylinder end on the opposite side of the cylinder end, the cylindrical member defining a first fluid chamber between the piston and the cylinder end and a second fluid chamber between the piston and the another cylinder end; a fluid path member containing fluid, the fluid path member connected to the first and second fluid chambers at both end portions of the cylindrical member to provide fluid communication between the first and second fluid chambers; a regulating valve disposed on the fluid path member, the regulating valve capable of opening and closing, the fluid flowing in the fluid path member and the first and second fluid chambers while the regulating valve is open and the fluid stemming in the fluid path member and the first and second fluid chambers while the regulating valve is closed; and a controller that opens the regulating valve during normal operation of the linear motor and closes the valve either when power supply to the linear motor is interrupted or an emergency stop is instructed to the linear motor.

In this exemplary embodiment, during normal operation of the linear motor, the regulating valve is opened by the signal from the controlling device, and the fluid is moved freely in the fluid path. When the first-member operates, the fluid functions as a resistance against the double-acting cylinder, and the double-acting cylinder functions as a damper of the first member. When the power supply to the linear motor is interrupted or the linear motor is stopped in an emergency, the regulating valve device is closed when a signal is not received from the controller, the fluid pressure is maintained in the cylinder device, and the piston of the cylinder device is brought to a standstill. As a result, the first member, which is supported at the piston, can be completely stopped.

Therefore, the invention eliminates the need for various parts for a mechanical brake device. As a result, parts cost reduction and weight reduction of the first member can be achieved. The weight reduction of the first member lowers the capacity of the linear motor to the moving apparatus, which can contribute to the cost reduction. In addition, the entire moving apparatus can be downsized.

In another exemplary embodiment of the invention, the brake apparatus may farther include an oscillation absorber disposed on the first member, the oscillation absorber pressing against the second member either when power supply to the linear motor is interrupted or an emergency stop is instructed to the linear motor.

When a signal is cut off from the controller, the oscillation absorber is pressed against the second member to slow down the first member. Therefore, the oscillation absorber can increase the safety and the reliability so as to completely stop the first member.

BRIEF DESCRIPTION OF THE DRAWINGS

Various exemplary embodiments of the invention will be described in detail with reference to the following figures, wherein.

DETAILED DESCRIPTION OF PREFERRED EMBODIMENTS

Figure 1:
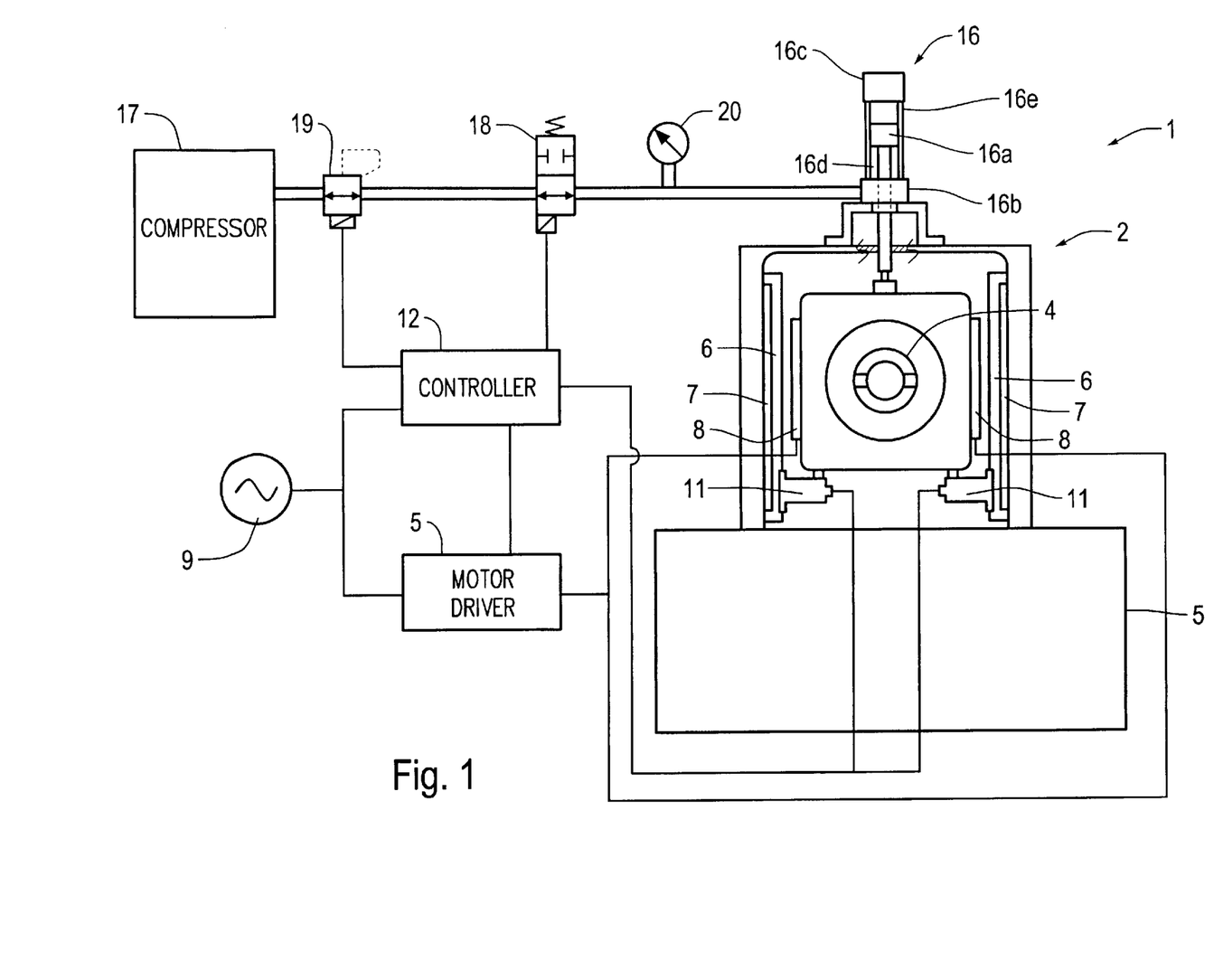
FIG. 1 is a schematic view showing a first exemplary embodiment of the invention.
Figure 2:
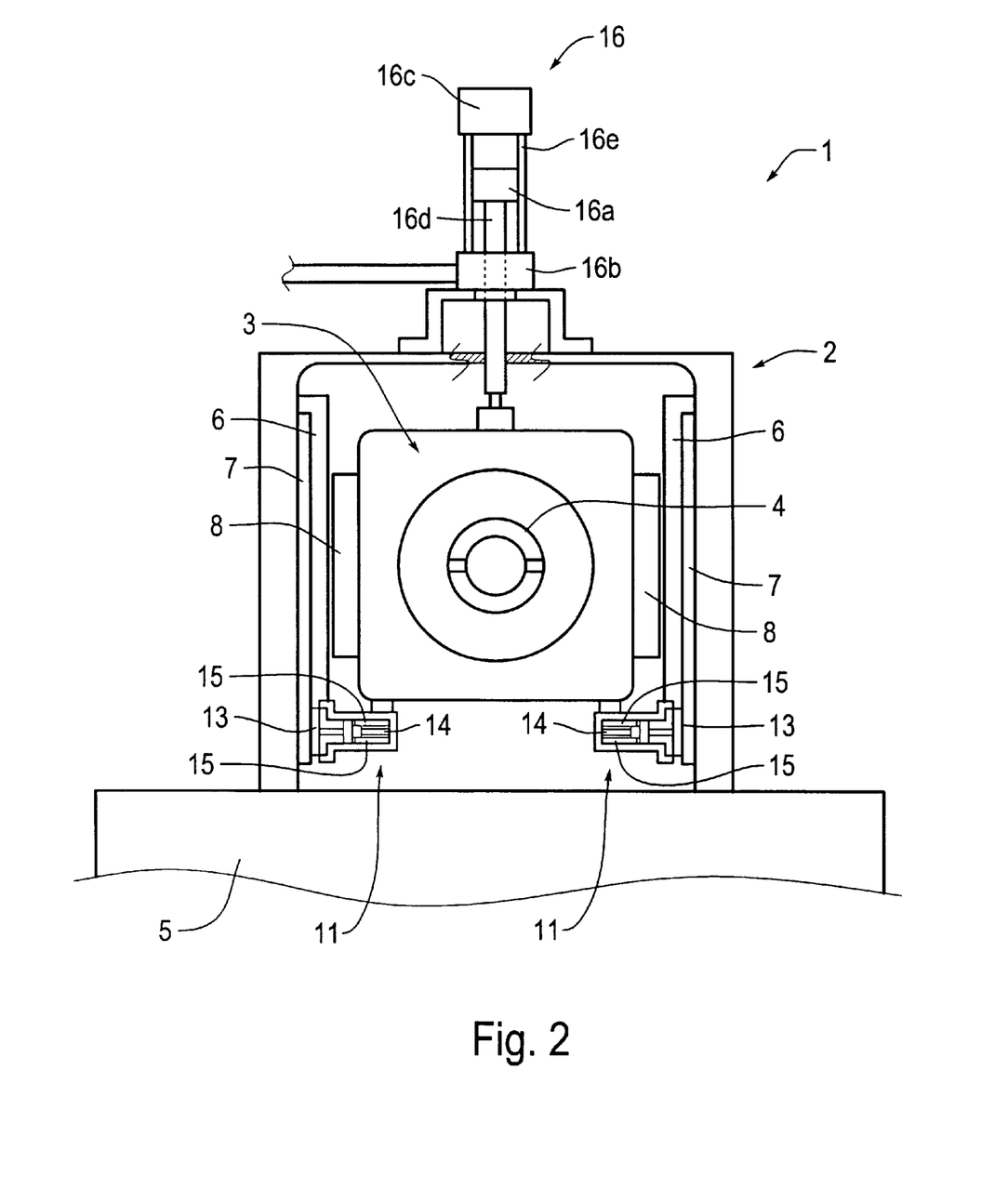
FIG. 2 is a partially enlarged view of FIG. 1.

FIGS. 1 and 2 show a first exemplary embodiment of the invention. In a machine tool 1 in which metals are cut or ground, a member on a stator side is a column 2 and a member on a movable member side is a headstock 3 carrying a spindle 4 therein. A linear motor is applied to the machine tool 1 as a drive method so as to drive the headstock 3 in a vertical direction.

The machine tool 1 includes the column 2, the headstock 3, and a bed 5 supporting the column 2. The column 2, which is formed in a square C shape, is secured to the bed 5 at both ends of the opening of the column 2. Provided on the inside surfaces on the right and left sides of the column 2 are fixed magnets 6, each made up of a plurality of permanent magnet segments whose polarities are alternately arranged, and friction members 7, each to be engaged with the magnetic brake device described later. The headstock 3, having the spindle 4, is positioned inside the hollow part of the column 2 so that the headstock 3 can be moved vertically by a linear guide device (not shown).

On the right and left sides of the headstock 3, coils 8 as movable members are disposed. When an exciting current is supplied to the coils 8 from a power supply 9 via a motor driver 10, a linear motor thrust is produced in the vertical direction of the headstock 3 by interaction between the fixed magnets 6 which face each other from across the air gap.

An air cylinder 16 is disposed on the top surface of the column 2 so that an operating direction in which the air cylinder 16 operates is at right angles to the top surface of the column 2. A cylindrical member 16e is attached to the top portion of the column 2. A piston 16a of the air cylinder 16 comes through the top surface of the column 2. The headstock 3, which is positioned in the hollow part of the column 2, is supported by the piston 16a. A head-side port 16b, which is the lower part of the air cylinder 16, is linked to a compressor 17 which serves as a source to supply high-pressure air to the air cylinder 16. In a route from the head-side port 16b to the compressor 17, a 2-port solenoid valve 18 and an electrical feed-back regulator 19 are disposed. The 2-port solenoid valve 18 and the electrical feedback regulator 19 are electrically connected to and controlled by a controller 12. A cap-side port 16c, which is the upper part of the air cylinder 16, is open to the air. Reference number 20 represents a pressure gauge.

Magnetic brakes 11 are provided to the left and right sides on the lower surface of the headstock 3. The motor driver 10 and the magnetic brakes 11 are electrically connected to and controlled by the controller 12. The magnetic brakes 11 utilize the attraction of electromagnets 14 to make contact with or separate from brake pads 13 included therein between the fixed magnets 6. During normal operation of the linear motor, the brake pads 13 are drawn in the magnetic brakes 11 and maintained by the electromagnets 14. When the power supply to the linear motor is interrupted or the linear motor is stopped in an emergency, the attraction of the electromagnets 14 is gone and the brake pads 13 are pressed against the friction members 7 of the column 2, which are positioned facing the magnetic brakes 11, by using the elasticity of the springs 15.

In this structure, during normal operation of the linear motor, the exciting current is supplied to the coils 8 from the power supply 9 via the motor driver 10. A thrust of the linear motor is produced in the vertical direction of the headstock 3 by interaction between the fixed magnets 6 and the headstock 3 is moved vertically. When the magnetic brakes 11 are energized, the magnetic brakes 11 hold the brake pads 13 by attraction at the electromagnets 14 and the solenoid valve 18 is held open.

The motor driver 10 sends, to the regulator 19, an electric signal corresponding to either the state of the headstock 3, the load applied to the motor driver 10, or both the state of the headstock 3 and the load applied to the motor driver 10, via the controller 12. The high-pressure air from the compressor 17 is regulated according to the electric signal at the regulator 19, and is supplied to the air cylinder 16. When the headstock 3 is moved vertically or stopped according to the electrical control of the motor driver 10, the high-pressure air is adjusted again at the regulator 19, and is supplied to the air cylinder 16. Specifically, the regulator 19 adjusts the air pressure in an air chamber 16d, which is provided between the piston 16a and the head-side port 16b in the air cylinder 16, so as to keep it constant. The regulator 19 raises the air pressure to be supplied when the piston 16a rises, and lowers the air pressure to be supplied when the piston 16a lowers. The brake apparatus of the first exemplary embodiment, made up of the air cylinder 16, the compressor 17, the 2-port solenoid valve 18, and the regulator 19, functions as a counterbalance which can firmly operate the headstock 3 supported at the piston 16a, independently of fluctuations of the load.

On the other hand, when the power supply to the linear motor is interrupted or the linear motor is stopped in an emergency, the linear motor loses its thrust, and the headstock 3 goes into a free fall state. Simultaneously, as the electric current through the magnetic brakes 11 and the solenoid valve 18 is stopped (the electrical signal disappears), the solenoid valve 18 is switched to a closed state and the high-pressure air is hermetically sealed in the air cylinder 16, thus enabling the piston 16a to stop immediately. Further, when the current is stopped (the electrical signal disappears), the magnet brakes 11 press the brake pads 13, which were drawn in and maintained by the electromagnets 14, against the friction members 7 of the column 2, which face the magnet brakes 11, by use of the elasticity of the springs 15, thus enabling the headstock 3 to be stopped.

The headstock 3 supported by the piston 16a is capable of suddenly slowing down to a standstill by the brake apparatus of the first exemplary embodiment. In addition, the magnetic brakes 11 operate as oscillation absorbers or auxiliary brake devices for the brake apparatus of the first embodiment, and are capable of increasing the safety and the reliability to completely stop the headstock 3.

The brake device uses a fluid having a compressibility (e.g. air in the first exemplary embodiment). The brake device including the air cylinder 16 is useful to move the member on the movable member side in the vertical direction. In such a case as the first exemplary embodiment, during the braking, the air, which is hermetically sealed in the air chamber 16d which is provided between the piston 16a and the head-side port 16b in the air cylinder 16, is compressed by the weight of the headstock 3 having the spindle 4, and the headstock 3 may drop after the braking.

The magnetic brakes 11 are the oscillation absorbers or the auxiliary brake devices disposed so as to reduce the vertical oscillation of the headstock 3 in a short time through the use of the friction in order to stop the headstock 3. Therefore, the friction member used in the magnetic brakes 11 can be smaller in size compared with the conventional structure in which emergency stop is made only by the magnetic brake.

The headstock 3 is only supported at the air cylinder 16, and it is not necessary to dispose various parts for the mechanical brake device. Therefore, the cost for parts and the weight of the headstock 3 can be reduced. The weight reduction of the headstock 3 thus lowers the capacity requirement for the linear motor to the moving apparatus, thus resulting in a cost reduction. Furthermore, the entire moving apparatus can be downsized because there is no need to upsize the headstock 3.

In the first exemplary embodiment, the fixed magnet 6 is used as the stator and the coils 8 are used as the movable member. As should be appreciated, any type of structure using a magnetic circuit is possible as long as a general linear motor that produces the linear motion directly is included. The magnetic brakes 11 are provided in two places, on the right and left sides of the lower surface of the headstock 3, but may be provided on the sides of the headstock 3. In addition, a brake that holds the piston 16a of the cylinder 16 may be provided. Further, instead of the solenoid valve 18 and the regulator 19 that operate as a regulating valve device, a proportional control valve or an electrohydraulic servovalve may be used.

In the first exemplary embodiment, the air cylinder 16 is provided on the upper part of the column 2, but can be provided under the column 2 as long as a space to install the air cylinder 16 between the headstock 3 and the bed 5 can be provided. The air cylinder 16 can be provided on a side of the column 2 by bending the piston 16a in a U-shape. Further, in another exemplary embodiment, a jointed rod supported at a fulcrum may be disposed between a rod directly connected to the headstock 3 and the piston 16a so that the jointed rod rocks in a seesaw fashion. In this modification, the air cylinder 16 can be provided in a nonparallel direction relative to the moving direction of the head stock 3.

In the first exemplary embodiment, the machine tool 1 is structured to move the headstock 3 in a vertical direction. However, the machine tool 1 may be structured to move the headstock 3 in a vertically inclined direction. Thus, it is necessary that the headstock 3 moves downward by gravity when an exciting current is not supplied to the coils 8 of the machine tool 1 and the headstock 3 is within a moving range thereof.

Figure 3:
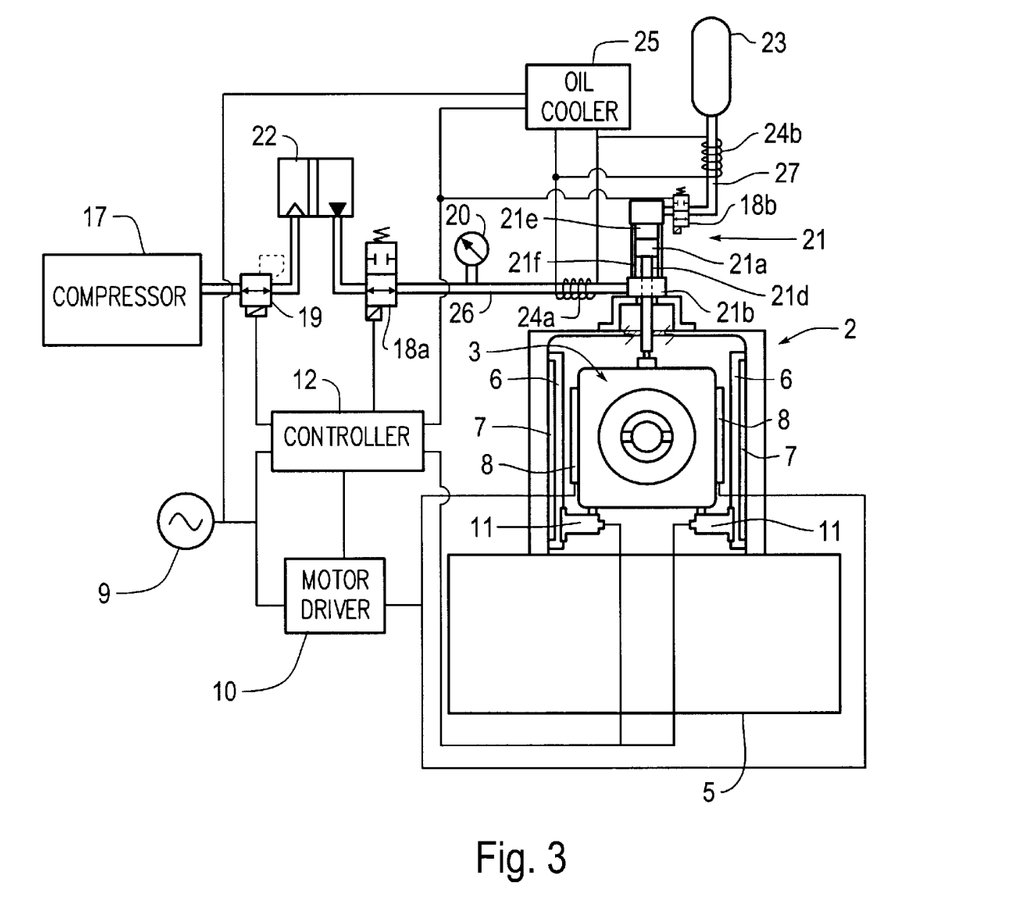
FIG. 3 is a schematic view showing a modification of the first exemplary embodiment.

FIG. 3 shows a modification of the first exemplary embodiment. In this figure, the same elements as those used in the first exemplary embodiment are indicated by the same numbers used in FIGS. 1 and 2.

In the modification, the air cylinder 16 is changed to a hydraulic cylinder 21 and a piston 21a is connected to the headstock 3. A cylindrical member 21f is attached to the top portion of the column 2. A head-side port 21b, which is the lower part of the hydraulic cylinder 21, is linked to a pneumatic-hydraulic converter 22 via an oil tube 26. A 2-port solenoid valve 18a and an oil pressure gauge 20 are positioned along the oil tube 26. The electrical feedback regulator 19 is connected to the pneumatic-hydraulic converter 22 via a tube in which an air pressure is kept. A cap-side port 21C of the hydraulic cylinder 21 is connected to an accumulator 23 via an oil tube 27.

Along the oil tubes 26, 27 in which oil passes, are disposed heat exchangers 24a, 24b connected to an oil cooler 25. The heat exchangers 24a, 24b, and the oil cooler 25 are structured so as to immediately remove the heat generated when oil passes through the oil tubes 26, 27. The oil cooler 25 is electrically connected and controlled by the controller 12.

As with the oil tube 26, a 2-port solenoid valve 18b is connected on the oil tube 27 and is electrically connected to and controlled by the controller 12.

In the modification of the first exemplary embodiment, the oil, as liquid that is not compressible, is supplied to the cylinder by use of the pneumatic-hydraulic converter 22. During the braking, the structure can prevent the oil, hermetically sealed in an air chamber 21d which is provided between the piston 21a and the head-side port 21b in the cylinder 21, from compressing due to the weight of the headstock 3 and the spindle 4. Therefore, the headstock 3 can be prevented from falling after the braking. Further, as the 2-port solenoid valve 18b is closed, the piston 21a can be prevented from moving upward by the oil filled in the oil chamber 21e between the piston 21a and the 2-port solenoid valve 18b.

In the invention, one of the air or the oil, or both of them can be applied to transmit the driving force to the cylinder. This holds true for a second exemplary embodiment described later.

The 2-port solenoid valve 18b, the accumulator 23, the heat exchanger 24b and the oil tube 27 may be omitted. In this modified structure, the cap-side port 21c is open to the air.

Figure 4:
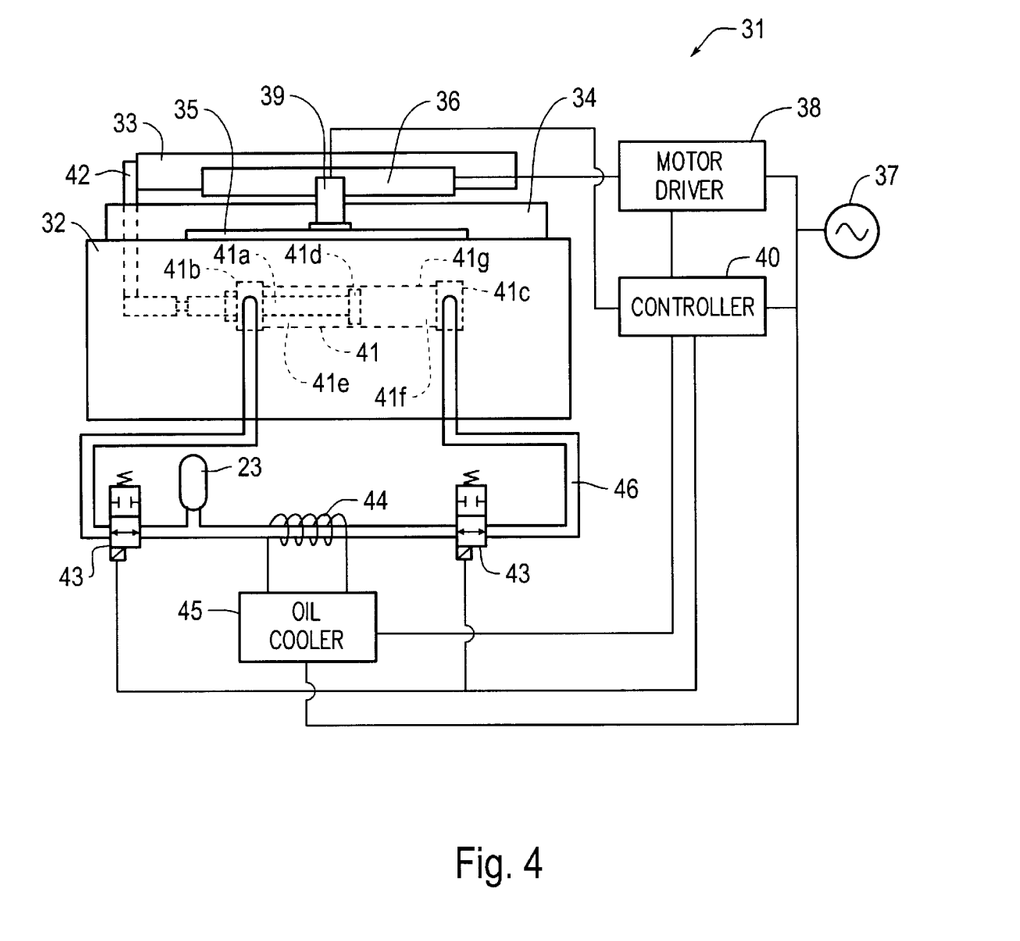
FIG. 4 is a schematic view showing a second exemplary embodiment of the invention.

FIG. 4 represents a second exemplary embodiment of the invention. In a machine tool 31 in which metals are cut or ground, a member on a stator side is a horizontal bed 32, and a member on a movable member side is a table 33. The linear motor is applied to the machine tool 31 as a drive method so as to move the table 33 in a horizontal direction. In this exemplary embodiment, oil is used for transmitting the driving force to the double-acting cylinder.

The machine tool 31 comprises the bed 32 and the table 33. On the upper surface of the bed 32, is a fixed magnet 34, as the stator, comprised of a plurality of permanent magnet segments whose polarities are alternately arranged, and a friction member 35 for engaging with the brake pad of the magnetic brake device. On the upper surface of the bed 32, the table 33 is disposed so that it can be moved by a linear guide device (not shown) from side to side in FIG. 4. On the lower surface of the bed 33, a coil 36, as the movable member, is provided. When the exciting current is supplied to the coil 36 from a power source 37 via a motor driver 38, a linear motor thrust is produced in the horizontal direction of the table 33 by interaction between the fixed magnet 34 and the bed 33 which face each other from across an air gap.

Magnetic brakes 39 are provided on both the front and rear ends of the table 33. The motor driver 38 and the magnetic brakes 39 are electrically connected to and controlled by a controller 40. As with the first exemplary embodiment and the modification, the magnetic brakes 39 use the attraction of the electromagnet to make contact with or separate from brake pads included therein.

Inside the bed 32, a double-acting cylinder 41 is provided so that the double-acting cylinder 41 operates in the horizontal direction. A cylindrical member 41g is attached to the bed 32. A piston 41 a of the double-acting cylinder 41 is linked to the table 33, which is disposed on the upper part of the bed 32, via a supporting member 42.

The double-acting cylinder 41 connects from a head-side port 41b through two 2-port solenoid valves 43 to a cap-side port 41c by a fluid path 46, in which oil is put. The double-acting cylinder 41 is structured so that the oil can be freely moved in an oil chamber 41e, the fluid path 46 and an oil chamber 41f extending toward a piston 41d. Between the two 2-port solenoid valves 43 in the fluid path 46, a heat exchanger 44 is disposed and connected to an oil cooler 45. The heat exchanger 44 and the oil cooler 45 are structured so as to immediately remove the heat generated when oil passes. On the fluid path 46, an accumulator 23 is disposed to absorb the change in volume accompanied with the motion of the piston 41d. The 2-port solenoid valves 43 and the oil cooler 45 are electrically connected to and controlled by the controller 40.

In this structure, during normal operation of the linear motor, the exciting current is supplied to the coil 36 from a power source 37 via the motor driver 38. A linear motor thrust is produced in the horizontal direction of the table 33 by interaction between the fixed magnets 34 which face each other across an air gap. As a result, the table 33 is capable of moving horizontally. During normal operation, when each magnetic brake 39 is energized, each magnetic brake 39 holds the brake pad by attraction, and the solenoid valves 43 are left open. The oil is freely movable in the double-acting cylinder 41 and the fluid path 46 according to the motion of the table 33.

When the table 33 is moved horizontally under the electrical control of the motor driver 38, the oil in the left and right oil chambers 41e, 41f of the double-acting cylinder 41 moves up and down the fluid path 46 based on the motion of the piston 41d interlocking the table 33. When the table 33 is stopped, the oil moves via the fluid path 46 to balance the oil pressure in the left and right oil chambers 41e, 41f of the cylinder 41. Thus, as the oil functions as a resistance to the double-acting cylinder 41, the double-acting cylinder 41 works as a damper for the table 33.

On the other hand, when the power supply to the linear motor is interrupted or the linear motor is stopped in an emergency, the linear motor loses its thrust and the table 33 moves into an inert running state. Simultaneously, the electric current through the magnetic brakes 39 and the solenoid valves 43 is stopped (the electrical signal disappears), the solenoid valves 43 are switched to a closed state, the oil is hermetically sealed in the double-acting cylinder 41, and the piston 41a is immediately stopped. In addition, when the electric current is stopped, the brake pad, which was drawn in and maintained by the electromagnet, in each magnetic brake 39 is pressed against the friction member 35 of the bed 32 facing each magnetic brake 39 by use of the elasticity of the spring within the magnetic brake 39, thus enabling the table 33 to stop. The brake apparatus of the second exemplary embodiment, made up of the double-acting cylinder 41, the solenoid valves 43, and the controller 40, enables the table 33 supported by the piston 41a and the supporting member 42 to slow down immediately and come to a standstill. Further, the magnetic brakes 39, as with the first exemplary embodiment, work as oscillation absorbers or auxiliary brake devices for the brake apparatus of the second exemplary embodiment, and are capable of increasing the safety and the reliability to completely stop the table 33.

The table 33 is only supported at the double-acting cylinder 41, and it is not necessary to dispose various parts for the mechanical brake device. As with the first exemplary embodiment, parts cost reduction and weight reduction of the table 33 can be achieved. The weight reduction of the table 33 thus requires a lower capacity for the linear motor to the moving apparatus, resulting in a cost reduction. Furthermore, the entire moving apparatus can be downsized because there is no need to upsize the table 33. Instead of the cylinder 41, a rodless cylinder can be used. In this modified exemplary embodiment, the piston 41a and the supporting member 42 are omitted and a piston yoke of the rodless cylinder(not shown), which extends in a direction perpendicular to the moving direction of the table 33, is directly attached to the table 33.

Further, in each exemplary embodiment described above, magnetic brakes are provided as an oscillation absorber or an auxiliary brake. However, the magnetic brake can be replaced by other types of friction brake, such as a brake device using an air cylinder or a hydraulic cylinder.

It should be understood that the invention is not limited in its application to the details of structure and arrangement of parts illustrated in the accompanying drawings. The invention is capable of other exemplary embodiments and of being practiced or performed in various ways without departing from the technical idea thereof, based on existing and well-known techniques among those skilled in the art.

What is claimed is:

1. A brake apparatus for a moving apparatus driven by a linear motor, the linear motor having a movable member and a stator which are disposed to face across an air gap from each other, the moving apparatus having a first member attached to the movable member and a second member attached to the stator, the first member moved along the stator when the linear motor is energized, the first member allowed to move downward by gravity along the second member when the linear motor is not energized and the first member is within a moving range thereof, a movement of the first member being controlled electrically in normal operation of the linear motor, the brake apparatus comprising:

a cylinder device having a cylindrical member attached to the second member and a piston connected to the first member, the cylindrical member having both end portions including a first cylinder end on a side of the first member and a second cylinder end on the opposite side of the first cylinder end, the cylindrical member defining a first fluid chamber between the piston and the first cylinder end;

a fluid supply source that supplies fluid under pressure to the first fluid chamber of the cylinder;

a first regulating valve disposed on a fluid path between the first fluid chamber of the cylinder and the fluid supply source, the first regulating valve capable of opening and closing, the fluid flowing in the fluid path and the first fluid chamber while the first regulating valve is open and the fluid fixed in the fluid path and the first fluid chamber while the first regulating valve is closed; and a controller that opens the first regulating valve during normal operation of the linear motor and closes the first regulating valve either when power supply to the linear motor is interrupted or when the linear motor is stopped in an emergency.

2. The brake apparatus according to claim 1, wherein the piston is directly connected to the first member.

3. The brake apparatus according to claim 1, wherein the fluid is liquid.

4. The brake apparatus according to claim 1, wherein the first regulating valve comprises a solenoid valve that closes while an electric signal is not supplied therefrom the controller.

5. The brake apparatus according to claim 1, wherein the first member can be moved along the stator in a vertical or vertically inclined direction when the linear motor is energized.

6. The brake apparatus according to claim 1, wherein the cylindrical member defining a second fluid chamber between the piston and the second cylinder end, the brake apparatus further comprising:

a fluid path member connected to the second fluid chamber; and a second regulating valve disposed on the fluid path member, wherein the controller opens the second regulating valve during normal operation of the linear motor and closes the second regulating valve either when power supply to the linear motor is interrupted or when the linear motor is stopped in an emergency.

7. The brake apparatus according to claim 1, further comprising an oscillation absorber disposed on the first member, the oscillation absorber pressing against the second member either when power supply to the linear motor is interrupted or when the linear motor is stopped in an emergency.

8. The brake apparatus according to claim 7, wherein the oscillation absorber comprises a magnetic brake mechanism.

9. The brake apparatus according to claim 1, further comprising a fluid pressure regulating device that regulates pressure of the fluid supplied to the first fluid chamber by the fluid supply source so that the pressure of the fluid in the first fluid chamber is maintained at a predetermined pressure.

10. The brake apparatus according to claim 1, wherein a section of the fluid path lowers the temperature of the fluid.

11. A brake apparatus for a moving apparatus driven by a linear motor, the linear motor having a movable member and a stator which are disposed to face across an air gap from each other, the moving apparatus having a first member attached to the movable member and a second member attached to the stator, the first member moved along the stator when the linear motor is energized, a movement of the first member controlled electrically in normal operation of the linear motor, the brake apparatus comprising:

a double-acting cylinder device having a cylindrical member attached to the second member and a piston which is connected to the first member, the cylindrical member having both end portions including a first cylinder end on a side of the first member and a second cylinder end on the opposite side of the first cylinder end, the cylindrical member defining a first fluid chamber between the piston and the first cylinder end and a second fluid chamber between the piston and the second cylinder end;

a fluid path member containing fluid, the fluid path member connected to the first and second fluid chambers at both end portions of the cylindrical member to provide fluid communication between the first and second fluid chambers;

a regulating valve disposed on the fluid path member, the regulating valve being capable of opening and closing, the fluid flowing in the fluid path member and the first and second fluid chambers while the regulating valve is open and the fluid fixed in the fluid path member and the first and second fluid chambers while the regulating valve is closed; and a controller that opens the regulating valve during normal operation of the linear motor and closes the valve either when power supply to the linear motor is interrupted or when the linear motor is stopped in an emergency.

12. The brake apparatus according to claim 11, wherein the double-acting cylinder device is parallel with a moving direction of the first member.

13. The brake apparatus according to claim 11, wherein the fluid is liquid.

14. The brake apparatus according to claim 11, wherein the regulating valve comprises a solenoid valve that closes while an electric signal is not supplied therefrom by the controller.

15. The brake apparatus according to claim 11, further comprising an oscillation absorber disposed on the first member, the oscillation absorber pressing against the second member either when power supply to the linear motor is interrupted or when the linear motor is stopped in an emergency.

16. The brake apparatus according to claim 15, wherein the oscillation absorber comprises a magnetic brake mechanism.

17. The brake apparatus according to claim 11, wherein a section of the fluid path lowers the temperature of the fluid.

18. A machine tool having a moving apparatus, the moving apparatus having a first member and a second member which are disposed to face with each other, one of the first and second member supporting a tool, another one of the first and second members supporting a work piece, the first member moved along the second member when the moving apparatus is energized, the first member allowed to move downward by gravity along the second member when the moving apparatus is not energized and the first member is within a moving range thereof, a movement of the first member being controlled electrically in normal operation of the moving apparatus, the machine tool comprising:

a cylinder device having a cylindrical member attached to the second member and a piston connected to the first member, the cylindrical member having both end portions including a first cylinder end on a side of the first member and a second cylinder end on the opposite side of the first cylinder end, the cylindrical member defining a first fluid chamber between the piston and the first cylinder end;

a fluid supply source that supplies fluid under pressure to the first fluid chamber of the cylinder;

a first regulating valve disposed on a fluid path between the first fluid chamber of the cylinder and the fluid supply source, the first regulating valve being capable of opening and closing, the fluid flowing in the fluid path and the first fluid chamber while the first regulating valve is open and the fluid fixed in the fluid path and the first fluid chamber while the first regulating valve is closed; and a controller that opens the first regulating valve during normal operation of the moving apparatus and closes the first regulating valve either when power supply to the moving apparatus is interrupted or when the moving apparatus is stopped in an emergency.

19. A machine tool having a moving apparatus, the moving apparatus having a first member and a second member which are disposed to face with each other, one of the first and second member supporting a tool, another one of the first and second members supporting a work piece, the first member moved along the second member when the moving apparatus is energized, a movement of the first member controlled electrically in normal operation of the moving apparatus, the machine tool comprising:

a double-acting cylinder device having a cylindrical member attached to the second member and a piston which is connected to the first member, the cylindrical member having both end portions including a first cylinder end on a side of the first member and a second cylinder end on the opposite side of the first cylinder end, the cylindrical member defining a first fluid chamber between the piston and the first cylinder end and a second fluid chamber between the piston and the second cylinder end;

a fluid path member containing fluid, the fluid path member connected to the first and second fluid chambers at both end portions of the cylindrical member to provide fluid communication between the first and second fluid chambers;

a regulating valve disposed on the fluid path member, the regulating valve being capable of opening and closing, the fluid flowing in the fluid path member and the first and second fluid chambers while the regulating valve is open and the fluid fixed in the fluid path member and the first and second fluid chambers while the regulating valve is closed; and a controller that opens the regulating valve during normal operation of the moving apparatus and closes the valve either when power supply to the moving apparatus is interrupted or when the moving apparatus is stopped in an emergency.

* * * * *